Jan. 4, 1949.　　　G. A. STACKHOUSE　　　2,457,935
COLLAPSIBLE CHILD'S CARRIAGE
Filed May 4, 1945　　　　　　　　　　　4 Sheets-Sheet 1

INVENTOR.
GEORGE A. STACKHOUSE
BY
Earl & Chappell
ATTORNEYS.

Jan. 4, 1949.  G. A. STACKHOUSE  2,457,935
COLLAPSIBLE CHILD'S CARRIAGE
Filed May 4, 1945  4 Sheets-Sheet 2
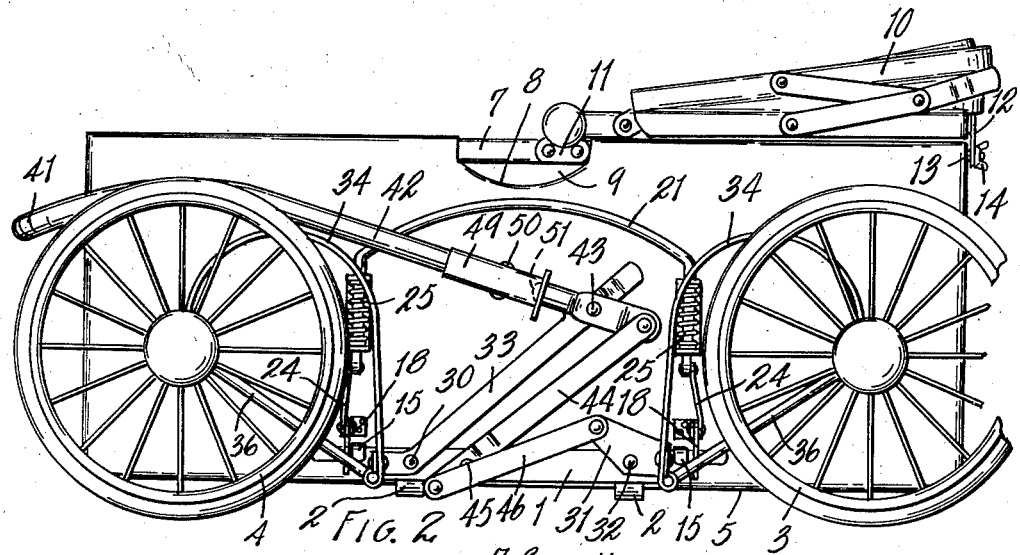
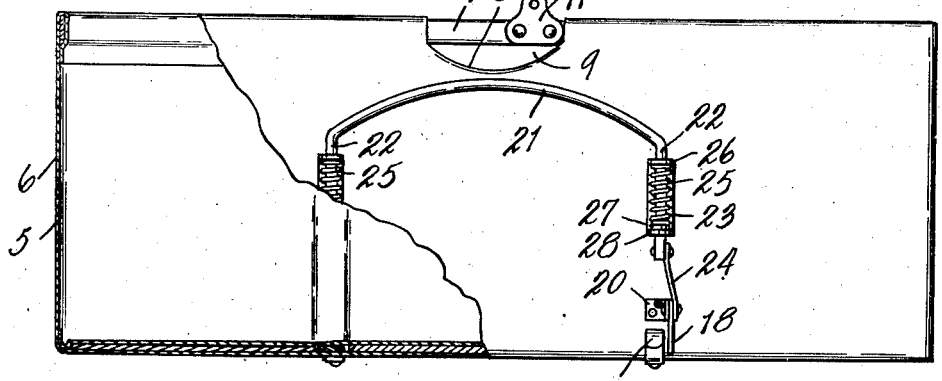
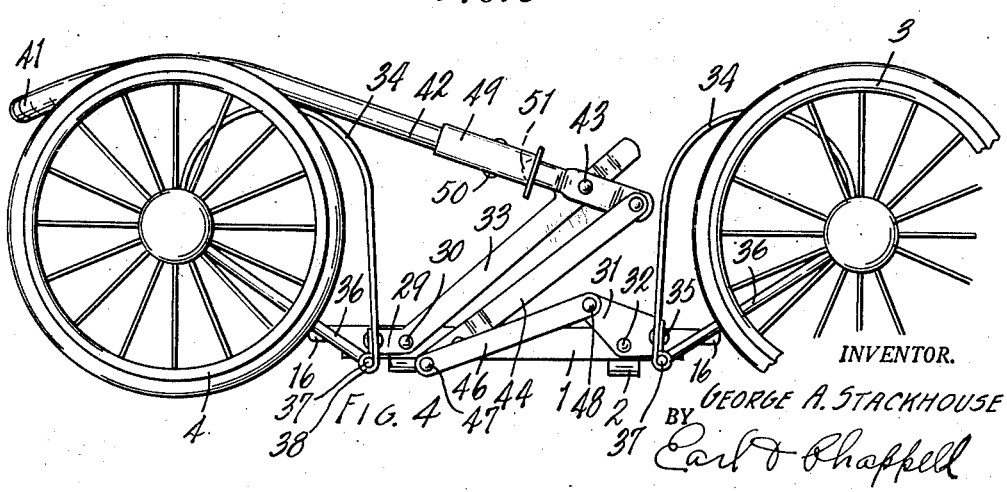
INVENTOR.
GEORGE A. STACKHOUSE
BY Carl & Chappell
ATTORNEYS.

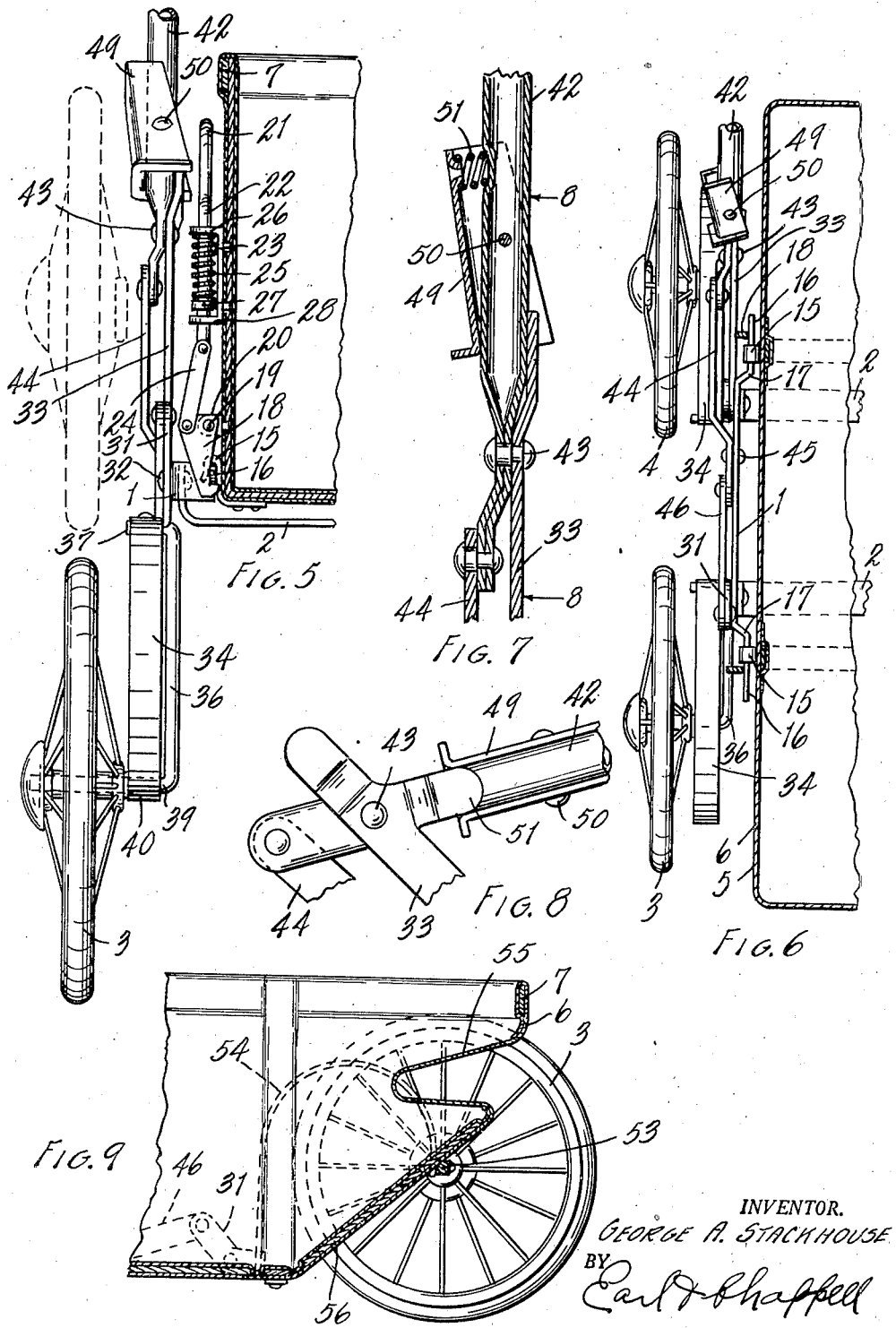

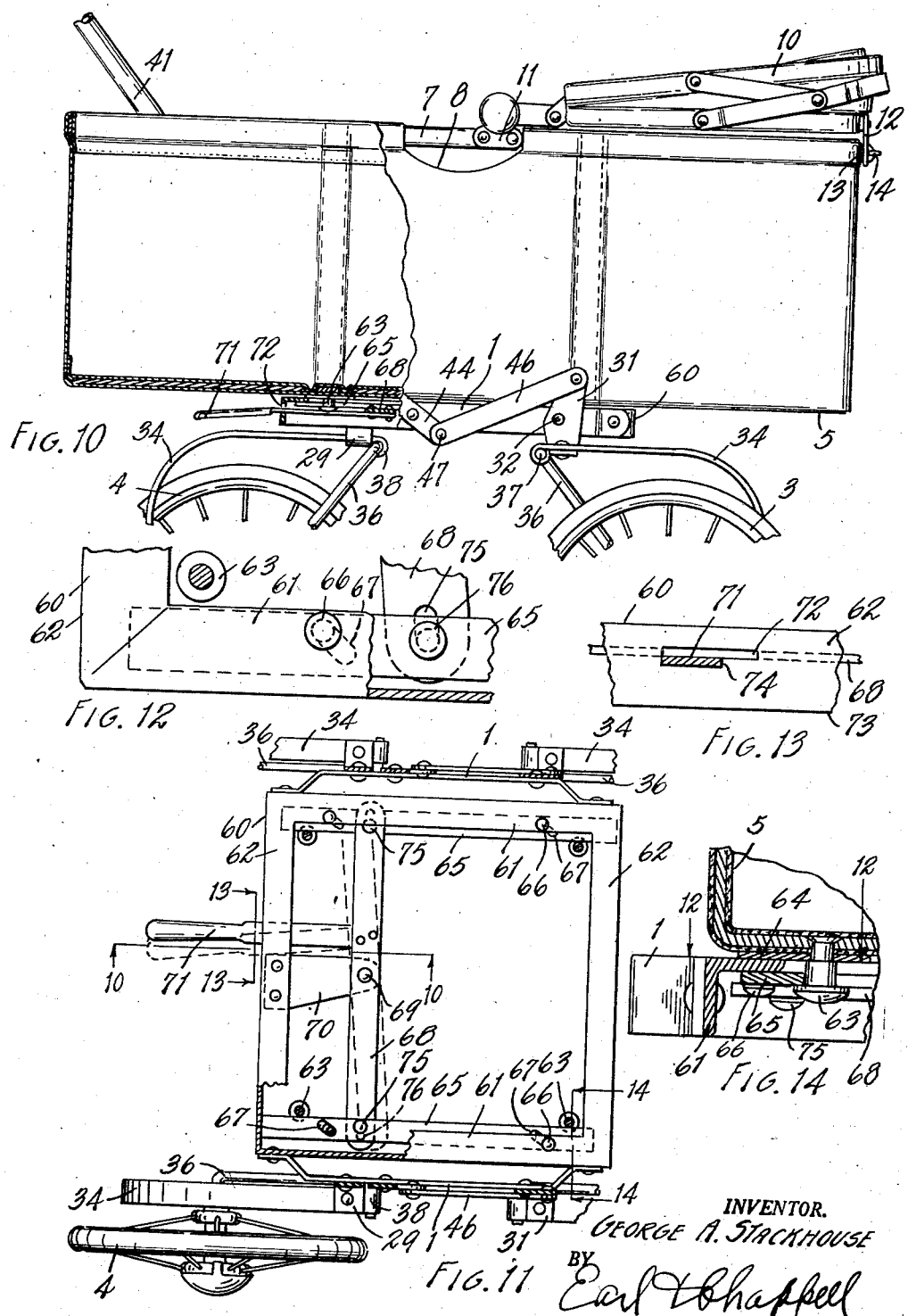

Patented Jan. 4, 1949

2,457,935

UNITED STATES PATENT OFFICE 2,457,935

COLLAPSIBLE CHILD'S CARRIAGE

George A. Stackhouse, Oakland, Calif., assignor to L. A. Young Spring & Wire Corporation, Detroit, Mich.

Application May 4, 1945, Serial No. 591,923

16 Claims. (Cl. 280—41)

This invention relates to improvements in collapsible child's carriage.

The main objects of this invention are:

First, to provide a collapsible child's carriage which is easily collapsed and erected and which is quite compact when collapsed.

Second, to provide a structure having these advantages in which the body of the carriage may be easily detached from the running gear frame and at the same time one when attached is very securely retained.

Third, to provide a collapsible carriage in which the parts are effectively locked both in erected position and in collapsed position.

Fourth, to provide a structure of this character in which the detachable body may be reversely positioned on the chassis or running gear frame.

Fifth, to provide a collapsible carriage in which all four of the wheels are springably supported for independent springing or what might be called knee action and at the same time are so supported as to provide stability and effective and easy steering and manipulation on curbs, steps and the like.

Objects relating to details and economies of the invention will appear from the description to follow. The invention is defined in the claims.

A structure which is a preferred embodiment of the invention is illustrated in the accompanying drawings, in which:

Fig. 2 is a fragmentary side elevation with the top and wheels collapsed.

Fig. 3 is a fragmentary side elevation partially in longitudinal section of the body removed from the running gear frame, the top being omitted.

Fig. 4 is a fragmentary side elevation with the structure collapsed as shown in Fig. 2 and with the body removed.

Fig. 5 is an enlarged fragmentary view partially in section on line 5—5 of Fig. 1.

Fig. 6 is a fragmentary view partially in horizontal section on line 6—6 of Fig. 1.

Fig. 7 is an enlarged fragmentary view in section on line 7—7 of Fig. 1 showing details of the locking means for maintaining the parts in erected position.

Fig. 8 is a fragmentary view from the rear on a line corresponding to line 8—8 of Fig. 7 showing the relation of the locking parts when the structure is collapsed.

Fig. 9 is a fragmentary view of a modified form or embodiment of wheel suspension and also showing a modified form of body.

Fig. 10 is a fragmentary side elevation partially in vertical longitudinal section on line 10—10 of Fig. 11 showing a modified form or embodiment of the invention particularly in the manner of detachably securing the body to the running gear frame or chassis.

Fig. 11 is a fragmentary plan view of the embodiment shown in Fig. 10.

Fig. 12 is a fragmentary view partially in section on line 12—12 of Fig. 14.

Fig. 13 is an enlarged fragmentary view in section on line 13—13 of Fig. 11.

Fig. 14 is an enlarged fragmentary view partially in section on line 14—14 of Fig. 11.

Figure 1:
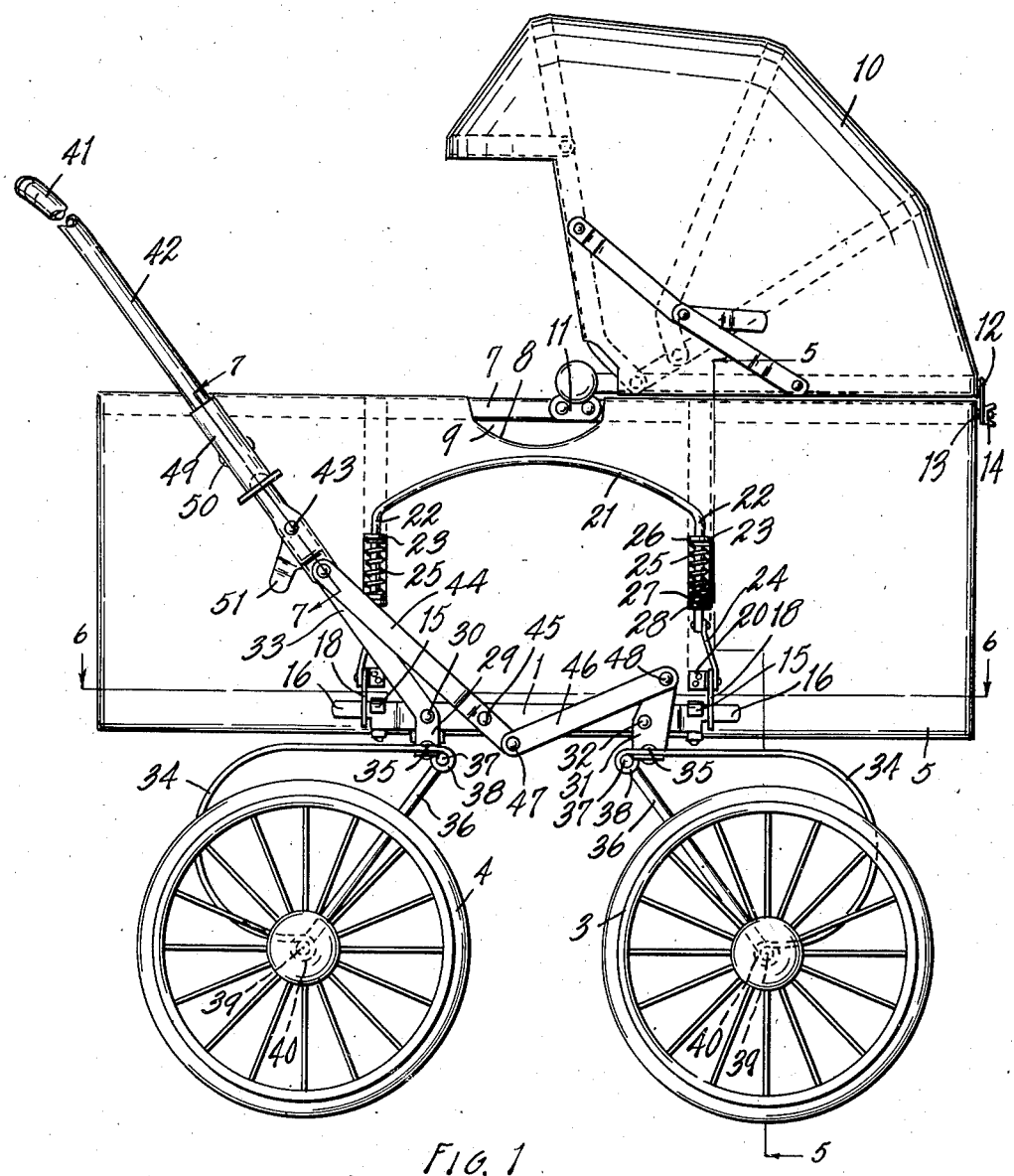
Fig. 1 is a side elevation of a structure embodying the features of the invention with the parts in erected position and the body positioned to face rearwardly.

In the embodiment of the invention illustrated, I provide a running gear or chassis frame comprising side bars 1 connected by the cross bars or members 2 to provide a fairly rigid-like frame. The side bars 1 are formed of flexed stock and are arranged vertically edgewise. The front and rear wheels 3 and 4 are, as shown, of the conventional rubber-tired type.

The body illustrated, designated generally by the numeral 5, is formed of a suitable frame and a covering 6 of leather or fabric. It will be understood, however, that this might be of any desired structure or material but it should be of such dimensions as to removably fit within the side members 1.

The frame desirably comprises top side members 7, the walls being cut away or conformed at 8 to provide a handhold 9 on each side. The top 10 is of the collapsible bowed type and is pivotally mounted on brackets 11. The top is provided with an anchoring link 12 adapted to engage the bolt 13 having a thumb screw 14. This prevents the top from accidentally swinging on its pivot.

The body is provided with pairs of downwardly facing hooks 15 which are adapted to engage over the upper edges of the inwardly offset ends 16 of the side bars 1, see Fig. 6. The offsets 17 limit the longitudinal movement of the body on the side bars. The body is detachably secured to the side bars by means of catches 18, see Fig. 5, which are pivoted at 19 on the brackets 20 projecting from the sides of the body.

The bail-shaped release member 21 is mounted on the sides of the body in convenient position for grasping, the arms 22 of the release member being slidably supported in the brackets 23 and being connected by links 24 to the latches, as shown in Figs. 1 and 5.

Coiled springs 25 are provided to yieldingly urge or bias the release members downwardly and thereby urge the latches into engaging position. The upper ends of these springs engage the upper arms 26 of the brackets 23 while the lower ends of the springs engage thrust members 27 secured to the arms 22 of the release member. The lower arms 28 of the brackets 23 restrain or limit the movement of the thrust member 27.

When it is desired to release the body from the running gear the operator grasps the cross portion of the release member and this is positioned in such relation to the top side bars 7 of the frame that they may be simultaneously grasped and an upward pull with the fingers releases the body. When the body is disengaged from the frame it may be used as a bassinet or as a convenient means for carrying a child into the house or apartment or for placing it on the seat of an automobile.

The running gear portion of the carriage may be collapsed as shown in Fig. 4 for convenient handling or storage independently of the body.

The embodiment of my invention permitting the collaspsing comprises rear wheel hangers 29 which are pivoted at 30 on the side bars and the front wheel hangers 31 which are pivoted at 32 on the side bars, the rear wheel hangers being extended into actuating levers 33.

The wheel supports in the embodiment illustrated in Figs. 1 to 8 inclusive comprise the C-shaped or bowed springs 34 which are arranged to face inwardly, their upper arms being fixedly secured as indicated at 35 to the hangers so that they swing with the hangers.

The rod-like torsion or support members 36 have laterally turned upper ends 37 pivotally engaged in the eyes 38 formed on the ends of the springs 34. These members 36 are provided with stub axles 39 at their lower ends on which the wheels are mounted, these stub axles being of such length as to receive the eyes 40 of the lower arms of the springs, see Figs. 1 and 5.

With this arrangement, the wheels while having an independent knuckle action and effective spring support are supported against undesirable lateral twisting movement. The structure is easy to steer and manipulate over curbs and up and down steps and the like.

The handle 41 is preferably formed of a piece of tubing bowed to provide side members 42 which are pivoted at 43 to the actuating lever extensions 33 of the rear hangers 29. It will be noted, see Fig. 4, that the actuating lever 33 extends beyond the pivot 43 and also that the side members of the handle project beyond the pivot.

The front wheel hangers are simultaneously actuated with the rear wheel hangers, this being accomplished, in the embodiment illustrated, by providing an auxiliary actuating lever 44 which is pivoted to the side bars at 45, the lower ends of this auxiliary lever being connected to the front wheel hangers by the link 46 pivoted to the lower ends of the auxiliary actuating lever at 47 and to the upper ends of the front wheel hangers at 48.

To hold the parts in erected position, I provide U-sectioned lock members 49 which are pivoted at 50 to the side members of the handle and are adapted to embrace the handle and also the upper ends of the actuating lever 33 as is clearly shown in the drawings. With the parts thus engaged the parts are effectively locked in erected position.

To lock the parts in collapsed position, the actuating levers 33 are provided with laterally projecting arms 51 with which the handle side members are aligned when the parts are in collapsed position as shown in Figs. 2, 4 and 8, the locking members or keepers 49 being then engaged with the arms 51 thereby locking the parts in their collapsed position and permitting the collapsed structure being handled or carried by the handle. It will be noted that in collapsed position the wheels swing up on the sides of the body thereby providing a very compact structure.

The locking members or keepers 49 are provided with springs 52, see Fig. 7, so that they are normally urged to engaged position but may be released by pressing on the upper ends thereof.

In the embodiment of my invention shown in Fig. 9 the wheels are provided with axles 53 and are supported entirely by the springs 54 although torsion rods might be desired in this embodiment. To accommodate the axles, the body is formed with flexible end portions 55 having swingable bottom sections 56, see Fig. 9. This permits the ends of the body to collapse upwardly when the wheels are collapsed.

In the embodiment of my invention shown in Figs. 10 to 14 inclusive I illustrate a structure in which the means for detachably securing the body to the running gear frame or chassis is located under the body and is mainly carried by the running gear frame. In this embodiment, the running gear frame or chassis designated generally by the numeral 60 is generally rectangular and formed of angle iron arranged with the angles facing inwardly and downwardly. The frame comprises a pair of opposed side members 61 and connecting end members or cross members 62, these parts being formed integrally or integrally secured together as by welding, no joints being illustrated. The body 5 is provided with a downwardly projecting headed stud 63, four being illustrated, adapted to project into the frame as is clearly illustrated in Figs. 11 and 14. The body is provided with wear plates 64 adapted to rest on the frame and protect the covering of the body or the finish of the body. A pair of locking bars 65 are mounted on the under sides of the horizontal legs of the side members 61 of the frame by means of the headed rivets 66 which engage the diagonally disposed slots 67 in the locking bars so that as the locking bars are shifted longitudinally they are moved into and out of engagement with the studs 63 on the body.

The locking bars 65 are actuated by means of the lever 68 which is pivoted at 69 on the bracket 70 projecting forwardly from the rear cross piece 62 of the frame. A handle 71 is secured to this lever and projects rearwardly beyond the rear cross piece and through a slot 72 in the downwardly projecting legs 73 of the rear cross piece, the slot having an enlargement at one end to provide a keeper 74 for the lever in its engaged position. The lever is springable and is yieldingly held in engagement with the keeper when in registry therewith.

The locking bars 65 are provided with headed studs 75 which engage slots 76 on the lever, permitting the swinging of the lever. With this arrangement, the locking bars when actuated in one direction are moved laterally outward to disengage the studs 63 and when moved in the other direction are moved laterally inward into engagement therewith. This provides a very secure locking engagement and has the advantage over the other embodiment shown, of having the retaining means for the body effectively concealed.

As in the other described embodiments, the body may be positioned to face either way. If desired, the body may be provided with a seat but I have not illustrated that. The structure may be safely collapsed while occupied and there is no tilting of the body in collapsing. It will be noted that the handle folds downwardly in collapsing rather than swinging over the top of the carriage which might result in injury if released accidentally. In collapsing, the handle swings downwardly and also there is a downward movement of the body as the wheels swing up at the sides thereof and this can be readily controlled.

As stated, the structure is effectively locked in both collapsed and erected positions for handling in either position. If desired, instead of providing straight axles with collapsible portions for the body, drop axles can be used which avoids the necessity of providing the collapsible feature of the body. I have not illustrated such a structure as it is believed that its use will be clearly understood.

I have illustrated and described my invention in embodiments thereof which I have found to be highly practical. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a collapsible carriage, the combination of a running gear frame comprising side bars and connecting cross members, wheels, actuating levers pivotally mounted on said side bars and constituting rear wheel hangers, front wheel hangers pivotally mounted on said side bars, a handle comprising side members pivotally mounted on said actuating levers with their pivots in spaced relation to the ends thereof and with the ends of the handle side members extending below the pivots, said actuating levers being provided with laterally projecting arms with which the handle side members may be aligned when the handle is collapsed, keepers pivotally mounted on said handle side members to be engaged with the ends of said actuating levers when the handle is erected or with said arms on said actuating levers when the handle is collapsed, auxiliary actuating levers pivotally mounted on said side bars and pivotally connected to the said handle side members below the pivotal connections thereof to said actuating levers, links connecting the lower ends of said auxiliary actuating levers to the upper ends of said front wheel hangers, front and rear wheel supports comprising curved springs disposed in opposed facing relation with their upper ends secured respectively to the lower ends of said front wheel hangers and to said actuating levers to swing therewith, wheel supporting arms provided with stub axles for said wheels pivotally engaged with the upper ends of said springs, the lower ends of said springs being engaged with the stub axles of said supporting arms, and a body detachably mounted on said side bars, said wheel supports and the wheels collapsing upwardly at the sides of said body.

2. In a collapsible carriage, the combination of a running gear frame comprising side bars and connecting cross members, wheels, actuating levers pivotally mounted on said side bars and constituting rear wheel hangers, front wheel hangers pivotally mounted on said side bars, a handle comprising side members pivotally mounted on said actuating levers with their pivots in spaced relation to the ends thereof and with the ends of the handle side members extending below the pivots, said actuating levers being provided with laterally projecting arms with which the handle side members may be aligned when the handle is collapsed, keepers pivotally mounted on said handle side members to be engaged with the ends of said actuating levers when the handle is erected or with said arms on said actuating levers when the handle is collapsed, auxiliary actuating levers pivotally mounted on said side bars and pivotally connected to said handle side members below the pivotal connections thereof to said actuating levers, links connecting the lower ends of said auxiliary actuating levers to the upper ends of said front wheel hangers, front and rear wheel supports comprising curved springs secured at their upper ends to the lower ends of said front wheel hangers and to said actuating levers to swing therewith, and a body detachably mounted on said side bars, said wheel supports and the wheels collapsing upwardly at the sides of said body.

3. In a collapsible carriage, the combination of a running gear frame comprising side bars and connecting cross members, wheels, actuating levers pivotally mounted on said side bars and constituting rear wheel hangers, front wheel hangers pivotally mounted on said side bars, a handle comprising side members pivotally mounted on said actuating levers with their pivots in spaced relation to the ends thereof and with the ends of the handle side members extending below the pivots, said actuating levers being provided with laterally projecting arms with which the handle side members may be aligned when the handle is collapsed, keepers pivotally mounted on said handle side members to be engaged with the ends of said actuating levers when the handle is erected or with said arms on said actuating levers when the handle is collapsed, auxiliary actuating levers pivotally mounted on said side bars and pivotally connected to the said handle side members below the pivotal connections thereof to said actuating levers, links connecting the lower ends of said auxiliary actuating levers to the upper ends of said front wheel hangers, front and rear wheel supports comprising curved springs disposed in opposed facing relation with their upper ends secured respectively to the lower ends of said front wheel hangers and to said actuating levers to swing therewith, wheel supporting arms provided with stub axles for said wheels pivotally engaged with the upper ends of said springs, the lower ends of said springs being engaged with the stub axles of said supporting arms, and a body carried by said running gear frame, said wheels collapsing upwardly at the sides of said body.

4. In a collapsible carriage, the combination of a running gear frame comprising side bars and connecting cross members, wheels, actuating levers pivotally mounted on said side bars and constituting rear wheel hangers, front wheel hangers pivotally mounted on said side bars, a handle comprising side members pivotally mounted on said actuating levers in spaced relation to the ends thereof with the ends of the handle members extending below the pivots, said actuating levers being provided with laterally projecting arms with which the handle side members may be aligned when the handle is collapsed, keepers pivotally mounted on said handle side members to be engaged with the ends of said actuating levers when the handle is erected or with said arms on said actuating levers when the handle is collapsed, auxiliary actuating levers pivotally mounted on said side bars and pivotally connected to the said handle side members below the pivotal connection thereof to said actuating levers, links connecting the lower ends of said auxiliary actuating levers to the upper ends of said front wheel hangers, front and rear curved springs disposed in opposed facing relation with their upper ends secured to the lower ends of said front hanger and to said actuating levers to swing therewith, and wheel supporting arms provided with stub axles for said wheels pivotally engaged with the upper ends of said springs, the lower ends of said springs being engaged with the stub axles of said supporting arms.

5. In a collapsible carriage, the combination of a running gear frame comprising side bars and connecting cross members, wheels, actuating levers pivotally mounted on said side bars and constituting rear wheel hangers, front wheel hangers pivotally mounted on said side bars, a handle comprising side members pivotally mounted on said actuating levers, auxiliary actuating levers pivotally mounted on said side bars and operatively connected to said handle members, links connecting said auxiliary actuating levers to the said front wheel hangers, wheel supports comprising springs secured to said front hangers and to said actuating levers to swing therewith, a carriage body, and means for detachably securing said body to said running gear frame.

6. In a collapsible carriage, the combination of a running gear frame comprising side bars, wheels, actuating levers pivotally mounted on said side bars and constituting rear wheel hangers, front wheel hangers pivotally mounted on said side bars, a handle comprising side members pivotally mounted on said actuating levers, auxiliary actuating levers pivotally mounted on said side bars and operatively connected to said handle members, links connecting said auxiliary actuating levers to the said front wheel hangers, wheel supports comprising springs secured to said front hangers and to said actuating levers to swing therewith, and a carriage body mounted on said running gear frame, said wheel supports when collapsed swinging upwardly at the sides of the body.

7. In a collapsible carriage, the combination of a running gear frame comprising side bars, wheels, actuating levers pivotally mounted on said side bars and constituting rear wheel hangers, front wheel hangers pivotally mounted on said side bars, a handle comprising side members mounted on said actuating levers to constitute operating means therefor, auxiliary actuating levers pivotally mounted on said side bars and operatively connected to the said handle side members, links connecting the auxiliary actuating levers to the front wheel hangers, front and rear wheel supports comprising curved springs disposed in opposed facing relation with their upper ends secured respectively to the lower ends of said front wheel hangers and to said actuating levers to swing therewith, wheel supporting arms carried by said wheel hangers to swing therewith and provided with stub axles for said wheels, the lower ends of said springs being connected to said supporting arms, and a body detachably mounted on said frame, said wheel supports and the wheels collapsing upwardly at the sides of said body.

8. In a collapsing carriage, the combination of a running gear frame comprising side bars, wheels, actuating levers pivotally mounted on said side bars and constituting rear wheel hangers, front wheel hangers pivotally mounted on said side bars, a handle comprising side members mounted on said actuating levers to constitute operating means therefor, auxiliary actuating levers pivotally mounted on said side bars and operatively connected to the said handle side members, links connecting the auxiliary actuating levers to the front wheel hangers, front and rear wheel supports mounted on said wheel hangers to swing therewith, and a body mounted on said frame, said wheel supports and the wheels collapsing upwardly at the sides of said body.

9. In a collapsible carriage, the combination with a running gear frame, of wheels, wheel hangers pivotally mounted on said frame, a collapsible handle, means for locking said handle in its erected and collapsed positions, operating connections for said handle to said wheel hangers whereby they are simultaneously actuated to wheel erecting and to wheel collapsing positions, wheel supports comprising curved springs disposed in opposed facing outwardly bowed relation with their upper ends fixedly connected to the said wheel hangers so that the springs swing therewith, wheel supporting arms provided with stub axles for said wheels, said supporting arms being provided with stub axles for said wheels, said supporting arms being pivotally connected to said hangers, the lower ends of said springs being connected to the stub axles of said supporting arms, and a body detachably mounted on said side bars, said wheel supports and wheels collapsing upwardly at the sides of said body.

10. In a collapsible carriage, the combination with a running gear frame, of wheels, wheel hangers pivotally mounted on said frame, a collapsible handle, means for locking said handle in its erected and collapsed positions, operating connections for said handle to said wheel hangers whereby they are simultaneously actuated to wheel erecting and to wheel collapsing positions, wheel supports comprising curved springs disposed in opposed facing outwardly bowed relation with their upper ends fixedly connected to the said wheel hangers so that the springs swing therewith, and wheel supporting arms provided with stub axles for said wheels, said supporting arms being pivotally connected to said hangers, the lower ends of said springs being connected to the stub axles of said supporting arms.

11. In a collapsible carriage, the combination with a running gear frame, of wheels, wheel hangers pivotally mounted on said frame, a collapsible handle, means for locking said handle in its erected and collapsed positions, operating connections for said handle to said wheel hangers whereby they are simultaneously actuated to wheel erecting and to wheel collapsing positions, wheel supporting springs disposed in oppositely facing outwardly bowed relation with their upper ends connected to the said wheel hangers to swing therewith, axles for said wheels carried by said springs, and a body detachably mounted on said side bars, said wheel supports and wheels collapsing upwardly at the sides of said body.

12. In a collapsible carriage, the combination with a running gear frame, of wheels, wheel hangers pivotally mounted on said frame, a collapsible handle, means for locking said handle in its erected and collapsed positions, operating connections for said handle to said wheel hangers whereby they are simultaneously actuated to wheel erecting and to wheel collapsing positions, wheel supporting springs disposed in oppositely facing outwardly bowed relation with their upper ends connected to the said wheel hangers to swing therewith, and axles for said wheels carried by said springs.

13. In a collapsible carriage, the combination with a running gear frame, of wheels, wheel hangers pivotally mounted on said frame, a collapsible handle, means for locking said handle in its erected and collapsed positions, operating connections for said handle to said wheel hangers whereby they are simultaneously actuated to wheel erecting and to wheel collapsing positions, and wheel supporting springs disposed in oppositely facing outwardly bowed relation with their upper ends connected to the said wheel hangers to swing therewith.

14. In a collapsible carriage, the combination with a running gear frame, of a body detachably mounted thereon, wheels, actuating levers pivotally mounted on said frame and constituting rear wheel hangers, front wheel hangers pivotally mounted on said frame, a handle collapsibly mounted on said actuating levers, means for locking said handle in erected position on said levers, operating connections for said handle to said front wheel hangers whereby on the collapsing of the handle said actuating lever and said front wheel hangers are simultaneously actuated to wheel collapsing position, and wheel supports comprising springs secured to said front wheel hanger and said actuating lever to swing therewith.

15. In a collapsible carriage, the combination with a running gear frame, of wheels, actuating levers pivotally mounted on said frame and constituting rear wheel hangers, front wheel hangers pivotally mounted on said frame, a handle collapsibly mounted on said actuating levers, means for locking said handle in erected position on said levers, operating connections for said handle to said front wheel hangers whereby on the collapsing of the handle said actuating lever and said front wheel hangers are simultaneously actuated to wheel collapsing position, and wheel supports secured to said front wheel hanger and said actuating lever to swing therewith.

16. In a collapsible carriage, the combination with a running gear frame, of wheels, wheel hangers pivotally mounted on said frame, curved wheel supporting springs disposed in oppositely facing outwardly bowed relation having their upper arms fixedly secured to said wheel hangers to swing therewith, wheel supporting arms provided with stub axles, wheels on said stub axles, the supporting arms being pivotally connected to said hangers, the lower ends of said springs being connected to said stub axles of said supporting arms, and means for simultaneously actuating said wheel hangers in opposite directions to collapse the wheels at the sides of the supporting frame or to erect the same.

GEORGE A. STACKHOUSE.

REFERENCES CITED

The following references are of record in the file of this patent:

UNITED STATES PATENTS

| Number | Name | Date |
|---|---|---|
| 368,718 | Haller | Aug. 23, 1887 |
| 1,117,149 | Ambler | Nov. 17, 1914 |
| 1,125,934 | Beasecker | Jan. 26, 1915 |
| 1,193,896 | Hensel | Aug. 8, 1916 |
| 1,684,930 | Stinson | Sept. 18, 1928 |

FOREIGN PATENTS

| Number | Country | Date |
|---|---|---|
| 209,232 | Great Britain | Jan. 10, 1924 |
| 226,954 | Great Britain | Jan. 8, 1925 |
| 539,567 | France | Apr. 4, 1922 |
| 567,406 | France | Dec. 6, 1923 |